United States Patent
Kelly et al.

(10) Patent No.: US 11,232,017 B2
(45) Date of Patent: *Jan. 25, 2022

(54) SYSTEM FOR REFRESHING AND SANITIZING TESTING DATA IN A LOW-LEVEL ENVIRONMENT

(71) Applicant: Bank of America Corporation, Charlotte, NC (US)

(72) Inventors: Justin Daniel Kelly, Depew, NY (US); Philip Wayne Adams, Kernersville, NC (US); David William Crowe, Winston-Salem, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 303 days.

This patent is subject to a terminal disclaimer.

(21) Appl. No.: 16/594,184

(22) Filed: Oct. 7, 2019

(65) Prior Publication Data

US 2020/0034278 A1 Jan. 30, 2020

Related U.S. Application Data

(63) Continuation of application No. 15/416,141, filed on Jan. 26, 2017, now Pat. No. 10,437,708.

(51) Int. Cl.
| | |
|---|---|
| G06F 11/36 | (2006.01) |
| G06F 16/27 | (2019.01) |
| G06F 16/25 | (2019.01) |
| G06F 16/2455 | (2019.01) |
| G06F 16/21 | (2019.01) |

(52) U.S. Cl.
CPC ......... *G06F 11/3664* (2013.01); *G06F 16/21* (2019.01); *G06F 16/2455* (2019.01); *G06F 16/252* (2019.01); *G06F 16/27* (2019.01)

(58) Field of Classification Search
CPC ...... G06F 11/3664; G06F 16/21; G06F 16/27; G06F 16/2455; G06F 16/252
See application file for complete search history.

(56) References Cited

U.S. PATENT DOCUMENTS

| | | | |
|---|---|---|---|
| 5,511,020 A | 4/1996 | Hu et al. |
| 6,697,909 B1 | 2/2004 | Wang et al. |
| 7,043,599 B1 | 5/2006 | Ware et al. |
| 7,113,883 B1 | 9/2006 | House et al. |
| 7,313,825 B2 | 12/2007 | Redlich et al. |

(Continued)

*Primary Examiner* — Hares Jami
(74) *Attorney, Agent, or Firm* — Moore & Van Allen PLLC; Seongun M. Hong

(57) ABSTRACT

Embodiments of the present invention provide a system for refreshing data within the testing environment by sanitizing production data. In particular, the system may process real-world data obtained in the production environment and automatically replace sensitive or confidential information with realistic substitute data, then provide the sanitized data to the systems within the low level testing environment. The system may account for differences in table schema amongst a plurality of disparate databases within the production environment and the low level environment, thereby allowing the system to provide sanitized data only to the extent that it is needed for testing purposes. Furthermore, the system selectively provides sanitized test data on an as-needed basis, removing the need to continuously generate testing data.

20 Claims, 4 Drawing Sheets

(56) References Cited

U.S. PATENT DOCUMENTS

| | | | |
|---|---|---|---|
| 7,322,047 B2 | 1/2008 | Redlich et al. | |
| 7,571,150 B2 | 8/2009 | Raghavan et al. | |
| 7,865,461 B1 | 1/2011 | Best et al. | |
| 9,356,966 B2 | 5/2016 | Patwardhan et al. | |
| 2002/0065736 A1 | 5/2002 | Willner et al. | |
| 2003/0145017 A1 | 7/2003 | Patton et al. | |
| 2005/0246390 A1 | 11/2005 | House et al. | |
| 2005/0283667 A1* | 12/2005 | Batten | G06F 11/3672 714/25 |
| 2006/0004693 A1 | 1/2006 | Ramanathan et al. | |
| 2006/0080554 A1* | 4/2006 | McDonald | G06F 21/6254 713/189 |
| 2009/0172251 A1 | 7/2009 | Norman | |
| 2010/0192220 A1* | 7/2010 | Heizmann | G06F 21/6254 726/19 |
| 2012/0166582 A1 | 6/2012 | Binder | |
| 2012/0191757 A1 | 7/2012 | Gross et al. | |
| 2012/0284290 A1 | 11/2012 | Keebler et al. | |
| 2013/0080398 A1* | 3/2013 | Booth | G06F 21/6254 707/687 |
| 2013/0091204 A1 | 4/2013 | Loh et al. | |
| 2013/0091571 A1 | 4/2013 | Lu | |
| 2013/0254878 A1 | 9/2013 | Clarke et al. | |
| 2013/0304761 A1 | 11/2013 | Redlich et al. | |
| 2014/0012740 A1 | 1/2014 | Carson et al. | |
| 2014/0222701 A1 | 8/2014 | Loh et al. | |
| 2015/0006314 A1 | 1/2015 | Goulart et al. | |
| 2015/0143064 A1* | 5/2015 | Bhargava | G06F 11/1451 711/162 |
| 2015/0212984 A1 | 7/2015 | Bowden | |
| 2016/0132253 A1 | 5/2016 | Chiu | |
| 2016/0246542 A1 | 8/2016 | Salah et al. | |

* cited by examiner

002

```
┌─────────────────────────────────────────────────────────────┐
│  INSERT A DATA REFRESH REQUEST INTO A CONTROL TABLE         │
│                          200                                 │
└─────────────────────────────────────────────────────────────┘
                              │
┌─────────────────────────────────────────────────────────────┐
│  DETECT THE DATA REFRESH REQUEST WITHIN THE CONTROL TABLE   │
│                          201                                 │
└─────────────────────────────────────────────────────────────┘
                              │
┌─────────────────────────────────────────────────────────────┐
│  WRITE REFRESH INITIATION RECORD TO THE CONTROL TABLE       │
│                          202                                 │
└─────────────────────────────────────────────────────────────┘
                              │
┌─────────────────────────────────────────────────────────────┐
│  READ A SET OF TABLE METADATA FROM A DATA TABLE             │
│                          203                                 │
└─────────────────────────────────────────────────────────────┘
                              │
┌─────────────────────────────────────────────────────────────┐
│  COMPARE THE FIELDS WITHIN THE LLE TABLE SCHEMA WITH THE    │
│  FIELDS IN THE PRODUCTION DATA TABLE SCHEMA                 │
│                          204                                 │
└─────────────────────────────────────────────────────────────┘
                              │
┌─────────────────────────────────────────────────────────────┐
│  IDENTIFY, USING A SANITIZATION TABLE, FIELDS REQUIRING     │
│  SANITIZATION WITHIN THE PRODUCTION DATA                    │
│                          205                                 │
└─────────────────────────────────────────────────────────────┘
                              │
┌─────────────────────────────────────────────────────────────┐
│  READ SUBSTITUTE DATA FROM A SANITIZATION TABLE             │
│                          206                                 │
└─────────────────────────────────────────────────────────────┘
                              │
┌─────────────────────────────────────────────────────────────┐
│  REPLACE THE FIELDS REQUIRING SANITIZATION USING THE        │
│  SUBSTITUTE DATA                                             │
│                          207                                 │
└─────────────────────────────────────────────────────────────┘
                              │
┌─────────────────────────────────────────────────────────────┐
│  WRITE SANITIZED DATA TO THE TARGET TABLE                   │
│                          208                                 │
└─────────────────────────────────────────────────────────────┘
                              │
┌─────────────────────────────────────────────────────────────┐
│  WRITE REFRESH COMPLETION RECORD TO THE CONTROL TABLE       │
│                          209                                 │
└─────────────────────────────────────────────────────────────┘
                              │
┌─────────────────────────────────────────────────────────────┐
│  SEND A COMPLETION NOTIFICATION TO A USER                   │
│                          210                                 │
└─────────────────────────────────────────────────────────────┘
```

FIGURE 2

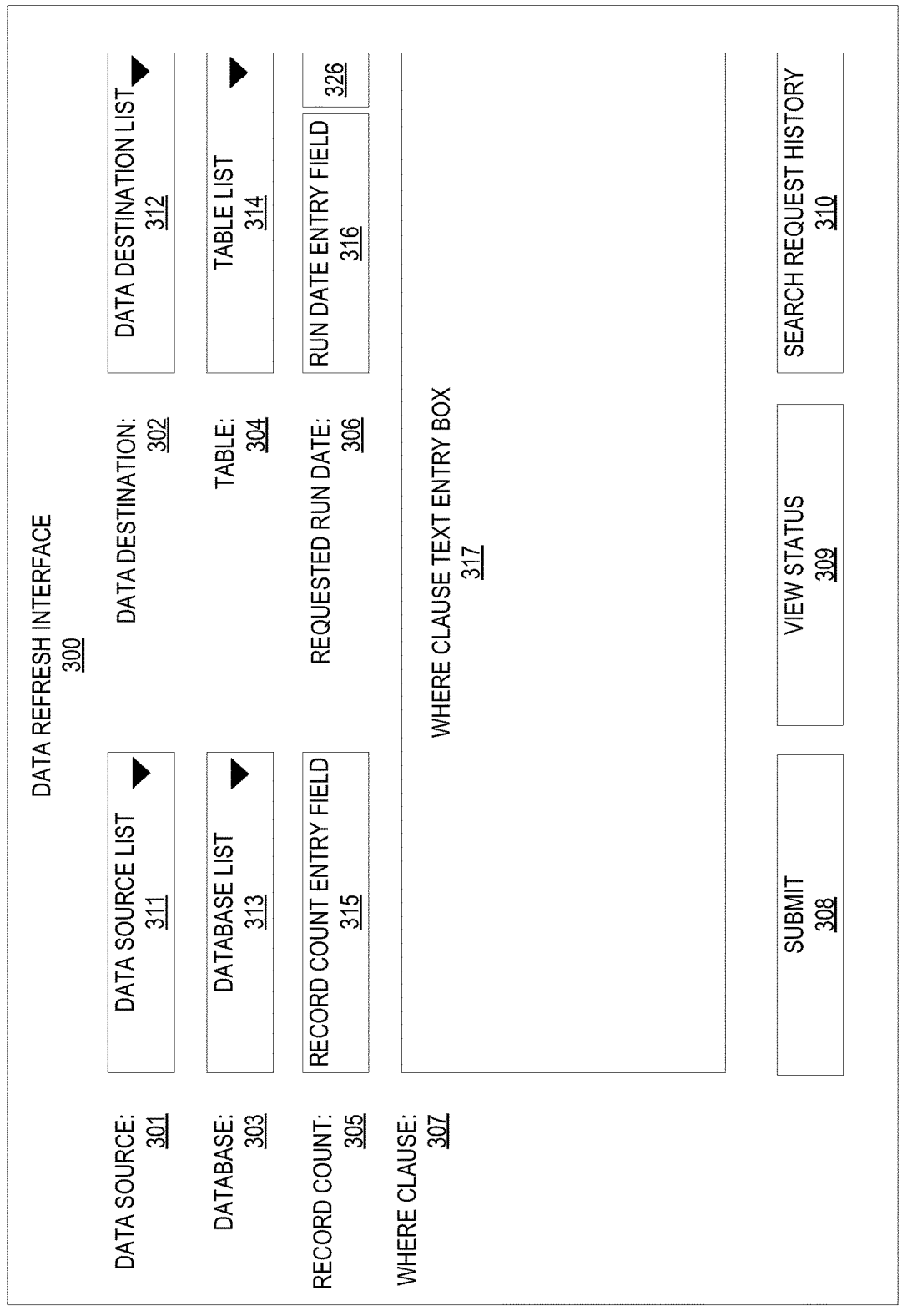

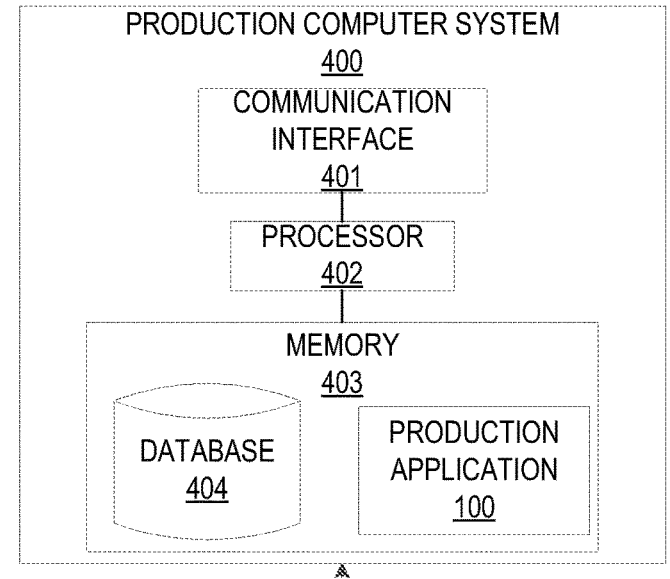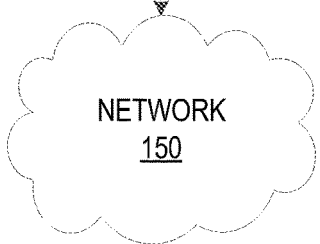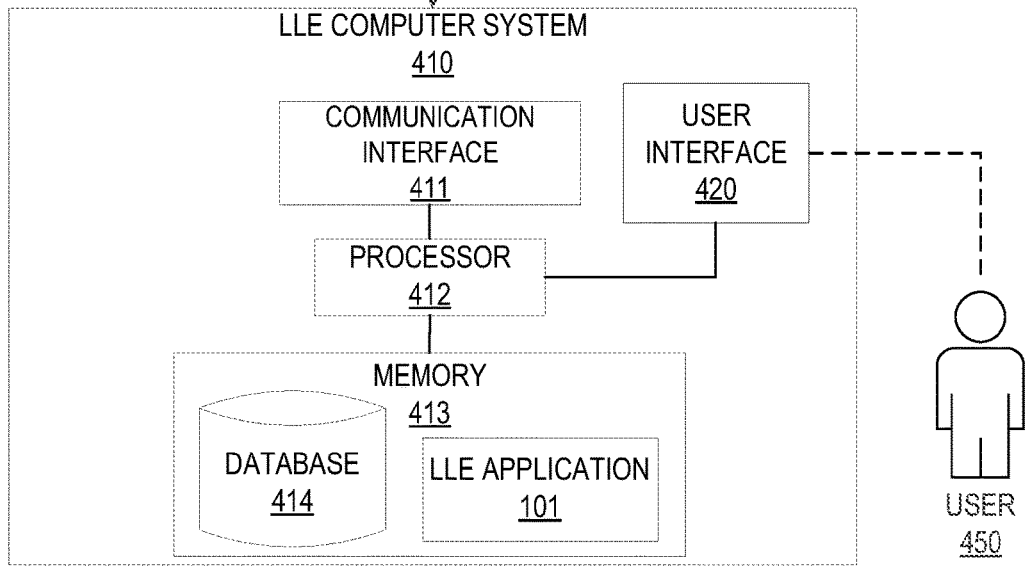
FIGURE 4

SYSTEM FOR REFRESHING AND SANITIZING TESTING DATA IN A LOW-LEVEL ENVIRONMENT

CROSS-REFERENCE TO RELATED APPLICATIONS

This application is a continuation of patent application Ser. No. 15/416,141, filed Jan. 26, 2017 and titled "SYSTEM FOR REFRESHING AND SANITIZING TESTING DATA IN A LOW-LEVEL ENVIRONMENT," the entire disclosure of which is hereby incorporated herein by reference.

BACKGROUND

In the software development context, it is crucial to conduct testing of applications within a testing environment before they are deployed into the broader-scale production environment. To this end, conventional testing methods will often use example data in lieu of real-world data to test the functionality of the applications.

That said, there are a number of technical problems with this type of conventional testing method. In particular, the example data used may not be fully reflective of the type of data that will actually be processed in the production environment, which may obscure coding errors during testing until they become apparent after the application has already been deployed. On the other hand, real-world data may be subject to security and privacy concerns and thus cannot be freely used within the testing environment. Furthermore, the database schemas may not necessarily match between the production database and the development database, requiring user intervention. Finally, conventional systems often continuously generate testing data without regard to whether there is an immediate need for the testing data, which leads to computing inefficiencies.

Accordingly, there is a need for a secure way to provide testing data that is as close to real-world data as possible.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing a unique system for sanitizing and refreshing testing data, comprising a production computer system comprising a first processor, a memory device, and a communication device, and a production application stored in the memory device, the production application comprising a production data table comprising production data, and a sanitization table comprising substitute data; and a low level environment computer system comprising a second processor, a memory device, a display, and a communication device, and a low level environment application stored in the memory device, the low level environment application comprising a control table, a system table, and a target table, wherein the low level environment application when executed by the second processor causes the second processor to receive a data refresh request from a user; and insert the data refresh request into the control table, wherein the production application when executed by the second processor causes the second processor to detect the data refresh request within the control table; read a set of table metadata from the system table; create a copy of the production data correlating to the set of table metadata; identify, using the sanitization table, fields requiring sanitization; replace the fields requiring sanitization using the substitute data; and write the copy of the production data into the target table.

In some embodiments, the low level application further comprises a data refresh interface, wherein the data refresh interface is presented on the display to the user and comprises a submit button, is configured to receive one or more inputs from the user; detect that the user has selected the submit button; and generate the data refresh request based on the one or more inputs from the user.

In some embodiments, the data refresh interface comprises a view status button, wherein the data refresh interface is further configured to detect that the user has selected the view status button; and generate a second interface and presents the second interface on the display, wherein the second interface indicates a status of a previously submitted data refresh request.

In some embodiments, wherein the data refresh interface comprises a search request history button, wherein the data refresh interface is further configured to detect that the user has selected the search request history button; and generate a third interface and presents the third interface on the display, wherein the third interface indicates a history of one or more previously submitted data requests.

In some embodiments, the one or more inputs from the user comprise a data source selection, a data destination selection, a database selection, and a table selection.

In some embodiments, the one or more inputs from the user comprises a record count selection, a requested run date, and a where clause, wherein the where clause further modifies the data refresh request to filter the production data.

Embodiments of the present invention also provide a computer program product for sanitizing and refreshing testing data, the computer program product comprising at least one non-transitory computer readable medium having computer-readable program code portions embodied therein, the computer-readable program code portions comprising an executable portion configured for receiving a data refresh request from a user; an executable portion configured for inserting the data refresh request into a control table; an executable portion configured for detecting the data refresh request within the control table; an executable portion configured for reading a set of table metadata from a system table; an executable portion configured for creating a copy of one or more production data correlating to the set of table metadata; an executable portion configured for identifying, using a sanitization table, fields requiring sanitization; an executable portion configured for replacing the fields requiring sanitization with one or more substitute data; and an executable portion configured for writing the copy of the one or more production data into a target table.

In some embodiments, the computer-readable program code portions further comprise an executable portion for presenting a data refresh interface on a user display, wherein the data refresh interface comprises a submit button and is configured to receive one or more inputs from the user; detect that the user has selected the submit button; and generate the data refresh request based on the one or more inputs from the user.

In some embodiments, the data refresh interface comprises a view status button, wherein the data refresh interface is further configured to detect that the user has selected the view status button; and generate a second interface and presents the second interface on the display, wherein the second interface indicates a status of a previously submitted data refresh request.

In some embodiments, the data refresh interface comprises a search request history button, wherein the data refresh interface is further configured to detect that the user has selected the search request history button; and generate a third interface and presents the third interface on the display, wherein the third interface indicates a history of one or more previously submitted data requests.

In some embodiments, the one or more inputs from the user comprise a data source selection, a data destination selection, a database selection, and a table selection.

In some embodiments, the one or more inputs from the user comprises a record count selection, a requested run date, and a where clause, wherein the where clause further modifies the data refresh request to filter the production data.

Embodiments of the present invention also provide a computer-implemented method for sanitizing and refreshing testing data, wherein a production computer system comprises a first processor, a memory device, and a communication device, and a production application stored in the memory device, the production application comprising a production data table comprising production data, and a sanitization table comprising substitute data, wherein a low level environment system comprises a second processor, a memory device, and a communication device, and a low level environment application stored in the memory device, the low level environment application comprising a control table, a system table, and a target table, said method comprising receiving, by the second processor executing the low level application, a data refresh request from a user; inserting, by the second processor executing the low level application, the data refresh request into the control table; detecting, by the first processor executing the production application, the data refresh request within the control table; reading, by the first processor executing the production application, a set of table metadata from the system table; creating, by the first processor executing the production application, a copy of one or more production data correlating to the set of table metadata; identifying, by the first processor executing the production application, fields requiring sanitization using the sanitization table; replacing, by the first processor executing the production application, the fields requiring sanitization with one or more substitute data; and writing, by the first processor executing the production application, the copy of the one or more production data into a target table.

In some embodiments, wherein the low level application further comprises a data refresh interface, wherein the data refresh interface is presented on the display to the user and comprises a submit button, is configured to receive one or more inputs from the user; detect that the user has selected the submit button; and generate the data refresh request based on the one or more inputs from the user.

In some embodiments, the data refresh interface comprises a view status button, wherein the data refresh interface is further configured to detect that the user has selected the view status button; and generate a second interface and presents the second interface on the display, wherein the second interface indicates a status of a previously submitted data refresh request.

In some embodiments, the data refresh interface comprises a search request history button, wherein the data refresh interface is further configured to detect that the user has selected the search request history button; and generate a third interface and presents the third interface on the display, wherein the third interface indicates a history of one or more previously submitted data requests.

In some embodiments, the one or more inputs from the user comprise a data source selection, a data destination selection, a database selection, and a table selection.

In some embodiments, the one or more inputs from the user comprises a record count selection, a requested run date, and a where clause, wherein the where clause further modifies the data refresh request to filter the production data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
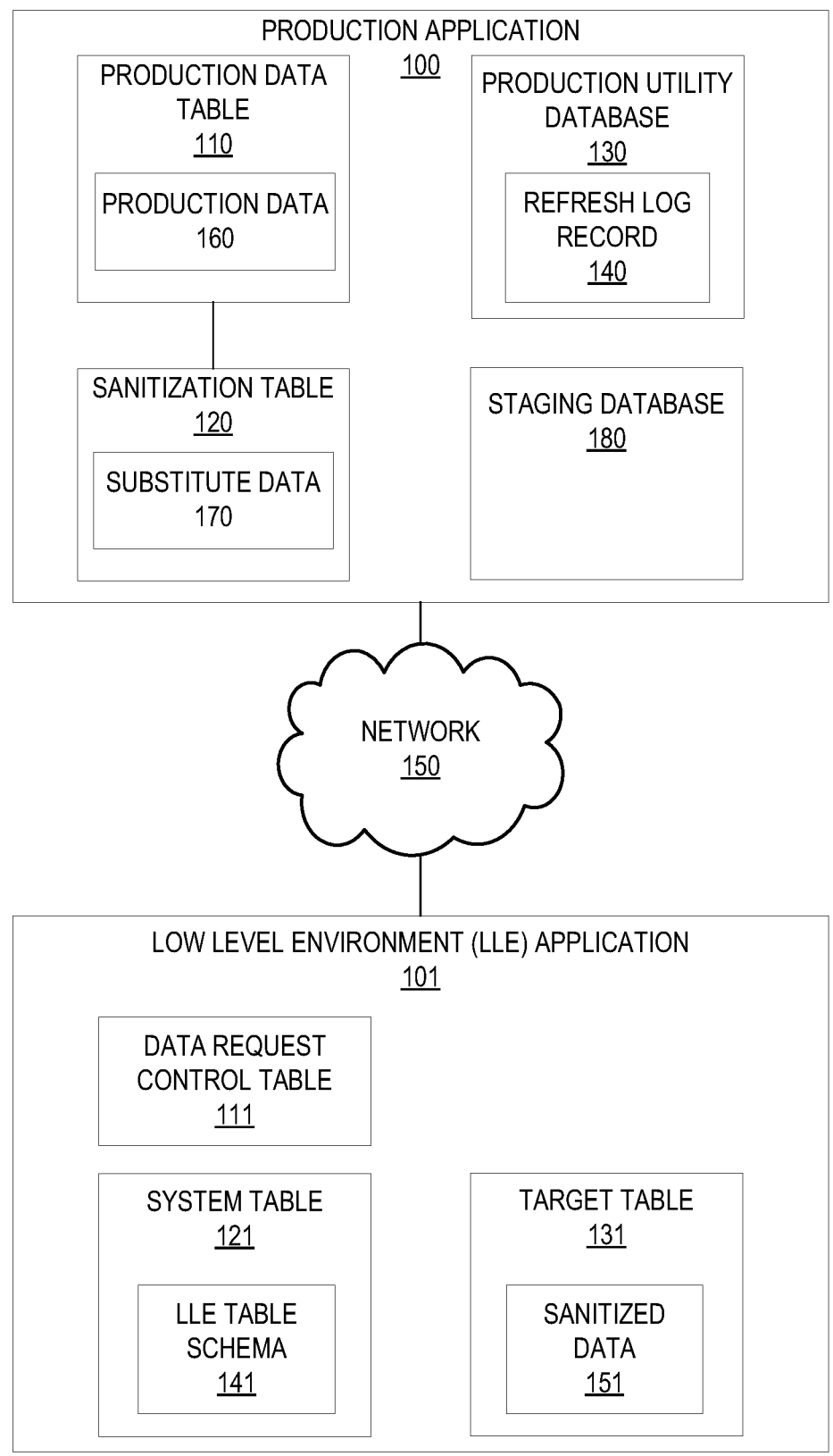

Having thus described embodiments of the invention in general terms, reference will now be made to the accompanying drawings, wherein:

FIG. 1 is a block diagram illustrating a high level overview of a system for refreshing and sanitizing data in a low level environment, in accordance with one embodiment of the present invention;

FIG. 2 is a process flow diagram illustrating a process for refreshing testing data using sanitized data, in accordance with one embodiment of the present invention;

FIG. 3 is a block diagram illustrating a graphical interface for initiating the testing data refresh process, in accordance with one embodiment of the present invention; and FIG. 4 is a block and symbol diagram illustrating an environment comprising computer systems involved in the data refresh and sanitization process, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Embodiments of the present invention provide a system for refreshing data within the testing environment by sanitizing production data. In particular, the system may process real-world data obtained in the production environment and automatically replace sensitive or confidential information with realistic substitute data, then provide the sanitized data to the systems within the low level testing environment. The system may account for differences in table schema amongst a plurality of disparate databases within the production environment and the low level environment, thereby allowing the system to provide sanitized data only to the extent that it is needed for testing purposes. Furthermore, the system selectively provides sanitized test data on an as-needed basis, removing the need to continuously generate testing data.

By refreshing testing data in this manner, the system addresses a number of computer technology-centric challenges as described above. In particular, the use of realistic testing data greatly reduces the incidence of software glitches of applications deployed in the production environment. As a result, the invention improves the processing efficiencies of the computing systems involved in the testing process by preventing the computing resource-intensive need to replace non-functional code in the production environment. Furthermore, selectively providing refreshed testing data is much less resource-intensive than continuously generating testing data, which further improves the efficiency of the computers within the system. The types of computing resources saved may include, but are not limited to, processing power, memory space, storage space, cache space, electric power, and networking bandwidth.

"Testing environment" or "low level environment" (LLE) as used herein refers a setting comprising one or more computer systems and applications used in software testing and development, such as server or client machines which may comprise databases using one or more types of table schema, to simulate the hardware and software instruments that would be used to run the application in the production environment. In some embodiments, the one or more computer systems are operatively connected over a computer network. The server and client machines may be embodied in individual, discrete hardware embodiments or may be virtual. Typically, the testing environment is smaller in scale compared to the production environment. In this way, the testing environment provides a way to test the functionality of new software using a representative sample of data to run the application in a simulated state, allowing developers to ensure that the applications function as intended and will continue to function when deployed in a live state with minimal incidences of misbehavior.

"Production environment" as used herein, in contrast to the testing environment, refers to a setting in which an application is deployed in computer hardware and software systems to be utilized in real-world scenarios by the end users. In some embodiments, the end users may be consumers of a software application accessed over the Internet. In some embodiments, the end users may be employees of a business or members of an organization who use the application for internal and external business or organizational purposes. Accordingly, there is a need to ensure that applications deployed live into the production environment are as technically error-free as possible, as error-prone code may lead to disruptions in service to the end users and/or their clients, which lead to inefficiencies in both the business or organization operations and computing inefficiencies associated with rectifying the erroneous code.

"Production data" as used herein refers to data within the production environment used by an application. In some embodiments, production data is the input according to which the application runs its various processes. In some embodiments, the production data may comprise data processed and manipulated by a number of business applications, such as client or partnership information. For instance, client data may be aggregated and processed by a business application to generate reports for internal business purposes. In such a use case, the client data may comprise various types of sensitive or confidential information, including, but not limited to, client names, addresses, social security numbers, contact information, account balances, and credit history.

"Testing data" as used herein refers to data within the low level environment used by a newly developed application for testing purposes. In some embodiments, the newly developed application may be an application for reporting and data analytics purposes for internal business use. Generally, it is desirable within the development context for the testing data to closely match the production data as much as possible. This ensures that necessary assumptions made while testing within the low level environment has a minimum impact on the suitability of an application for its intended purpose when scaled up to the production level. Accordingly, the system automatically replaces the sensitive information within the production data before making it available to the low level environment for testing purposes, without requiring user intervention. In other words, the users and systems within the low level environment have no need to know which portions of the data are considered sensitive, and thus are wholly precluded from accessing the sensitive or confidential data. All other non-sensitive aspects of the production data are preserved in order to provide testing data that is as realistic as possible.

"Data refresh" as used herein refers to an update to the testing data available to the systems within the low level environment. During software development, it is often desirable to periodically update testing data to ensure that the software is being tested with data that closely matches the data that is currently being used within the production environment. The system may send a data refresh request from the low level environment to the production environment.

"Sanitization" as used herein refers the removal of sensitive information from production data before making it available to the testing environment. A copy of the production data that has been scrubbed of sensitive information is particularly suitable as testing data, as it accurately represents the data as it would appear in real-world scenarios while complying with internal or government regulations regarding data security and privacy.

"Data table" as used herein refers to any table that is created with data to be processed or manipulated by the system. In some embodiments, data table may refer to a table that has not been created by default by the database vendor's applications.

FIG. 1 is a block diagram illustrating a high level overview of a system 001 for refreshing and sanitizing data in a low level environment, in accordance with one embodiment of the present invention. The system 001 comprises a production application 100 in operative communication with a low level environment application 101 over a network 150. The network 150 may be a system specific distributive network receiving and distributing specific network feeds and identifying specific network associated triggers. The network 150 may also be a global area network (GAN), such as the Internet, a wide area network (WAN), a local area network (LAN), or any other type of network or combination of networks. The network 150 may provide for wireline, wireless, or a combination wireline and wireless communication between devices on the network 150. The production application 100 may be implemented on a computer system, or distributed amongst a plurality of computer systems within the production environment. Similarly, the low level environment application 101 may be implemented on a computer system or distributed amongst a plurality of computer systems within the low level environment.

The production application 100 may comprise a production data table 110 which may comprise production data 160. In some embodiments, the production data 160 may comprise records of information regarding a business' clients, wherein one or more records are sensitive or confidential in nature. In other embodiments, the production data 160 may comprise confidential business records, which may include data received from upstream applications or information about financial transactions. In some embodiments, the production data 160 may be stored on a secured database such that access to the production data table 110 is restricted to authorized users. Each of the fields within the production data 160 may comprise a classification of information sensitivity. In some embodiments, this classification may be accounted for explicitly within the table schema or found within the table metadata.

The production application 100 may further comprise a sanitization table 120. Upon receiving a request for testing data, the production application 100 may read the table schema within the sanitization table 120 to determine which portions or fields of the production data 160 contain sensitive information. In some embodiments, the sanitization table 120 comprises a list of classifications, with the classifications being divided into increasing levels of sensitivity. In some embodiments, the production application 100 may detect the classification levels of the records in the production data 160, compare them against the levels of sensitivity within the sanitization table 120, and determine that certain fields must be sanitized if the classification of the fields are above a certain threshold. After determining which fields must be sanitized, the production application 100 may read the substitute data 170 within the sanitization table 120 and use the records within the substitute data 170 to replace the sensitive fields within the production data 160 before making it available as testing data. In some embodiments, the production application 100 may randomize the substitute data 170 and reduce redundancy of substitute data 170 used to sanitize the production data 160, which leads to more realistic testing data. In some embodiments, the production application 100 may further comprise a staging database 180, which serves as a temporary data store for sanitized data. In such embodiments, the production data 160 is sanitized using the sanitization table 120 and is subsequently copied to the staging database 180. Upon making the data within the staging database 180 available to the low level environment application (or the testing application) 101, the production application 100 may subsequently delete said data within the staging database 180 after a set period of time.

The low level environment application 101 comprises a data request control table 111, which stores data regarding requests for refresh of testing data. The data request control table may comprise information that specifies a source server name, a source database, and a source table. The data request control table 111 may comprise additional information regarding the data refresh request, such as a requested run date, a target LLE server, a "where" clause, and a truncate indicator. In some embodiments, the data request control table 111 may comprise user login and authorization data, which is used to auto-populate the credential fields needed to authorize the request.

The low level environment application 101 may further comprise a system table 121, which in turn comprises an LLE table schema 141. The LLE table schema 141 comprises fields of information within the testing data.

The low level environment application may further comprise a target table 131. The data within the target table 131 is organized according to the LLE table schema 141 within the system table 121. The target table 131 is the table to which sanitized data is provided for testing purposes upon receiving the data refresh request. Accordingly, the target table 131 may comprise sanitized data.

The production application 100 may further comprise a production utility database 130, which comprises a refresh log record 140, which in turn comprises records of refresh requests sent by the low level environment application 101. In some embodiments, the refresh request may take the form of a database query. In some embodiments, the database query may be written in SQL.

FIG. 2 is a process flow diagram illustrating a process 002 for refreshing testing data using sanitized data, in accordance with one embodiment of the present invention. The process 002 begins at step 200, by inserting a data refresh request into a control table. In some embodiments, the data refresh request is created within the control table by a developer within the low level environment. The developer may modify the data refresh request to change the scope and nature of the testing data requested.

The process continues to step 201, by detecting the data refresh request within the control table. In some embodiments, one or more systems within the production application read the control table to access the data refresh request. In some embodiments, the production application may read the control table at regular intervals to check for new data refresh requests. In some embodiments, interval may be a once per day basis. In other embodiments, the data refresh request may be conducted in near real time, wherein the low level environment application signals to the production application that a new data refresh request has been added to the control table, upon which the production application may open the control table to read the data refresh request therein.

The process continues to step 202, by writing a refresh initiation record to the control table. In some embodiments, the refresh initiation record is associated with a particular data refresh request or multiple data refresh requests such that the refresh initiation record signifies that the data refresh process for those specific requests has been initiated. In this way, the system may avoid starting duplicate processes for the requests within the control table.

The process continues to step 203, by reading a set of table metadata from a data table. In some embodiments, the table metadata comprises the LLE table schema. In such embodiments, the production application reads the LLE table schema to extract the fields for which the data refresh is requested.

The process continues to step 204, by comparing the fields within the LLE table schema with the fields in the production data table schema. In this way, the production application selectively refreshes only the fields within the LLE testing data that exist within the production data. In some embodiments, the fields may exist within the production data table schema but may not exist in the LLE table schema, or vice versa. In such a case, the system will skip the refresh and sanitization of said field. This allows the system to continue with the refresh without halting due to an error caused by discrepancies in the table schemas of the low level environment and the production environment. In some embodiments, the system may account for differences in data types between the LLE data and the production data. For instance, a field may be stored with a 50 character limit within the production data table, but may be stored with a 10 character limit within the LLE table. In such a case, the system may modify the production data within the field to conform to the schema of the LLE table, e.g. truncate the data within the production data table to conform with the 10 character limit within the LLE table.

The process continues to step 205, by identifying, using a sanitization table, fields requiring sanitization. The production application detects the classification level of each data field within the production data, upon which the production application compares the classification levels of the data fields with the classifications within the sanitization table. If the system detects that the classification levels of the data fields meet or exceed the threshold values as defined within the sanitization table, the production application considers said data fields to contain sensitive or confidential information, and subsequently the production application begins the sanitization process for those data fields.

The process continues to step 206, by reading substitute data from the sanitization table. The production application may then copy the identified data fields to a temporary location, such as a buffer, cache, or memory. The production application may associate a data field identified to contain sensitive information with a correlating data field within the substitute data. Accordingly, the system may create a copy of the production data correlating to the table metadata of the system table.

The process continues to step 207, by replacing the fields requiring sanitization using the substitute data. In particular, the production application replaces the copy of the data fields with the corresponding fields within the substitute data. For example, if the data field contains identifying information such as a social security number, the production application will replace the data field with a substitute social security number from the substitute data. The substitute data maintains the appearance of being genuine data to the low level environment application and to the low level developer to match the real world as closely as possible. This process continues until all of the data fields identified to contain sensitive information have been sanitized using the substitute data.

The process continues to step 208, by writing the sanitized data to the target table. In some embodiments, the target table is designated by the user.

The process continues to step 209, by writing a refresh completion record to the control table. This signifies the fulfillment of the particular data refresh request or requests for which the process was run.

Finally, the process concludes at step 210, by sending a completion notification to a user. In some embodiments, the user is a developer working within the low-level environment. In some embodiments, the user is the developer who originally requested the data refresh. In some embodiments, the system may send notifications to multiple developers associated with the application being developed for which the data refresh was requested.

FIG. 3 is a block diagram illustrating a graphical interface 003 for initiating the testing data refresh process, in accordance with one embodiment of the present invention. In some embodiments, the data refresh request may be compiled in SQL manually by the user, or by a preset script via a command line interface. In other embodiments, the system may provide a graphic interface 003 through which the user may create the data refresh request. In particular, a data refresh interface 300 is provided to the user, who in some embodiments is the low level environment developer who wishes to request a refresh of testing data. The data refresh interface 300 may indicate the option to select a data source 301, which is selectable by the user through the data source list 311. The data source list 311 may be a dropdown menu which comprises a list of servers containing production data that the user wishes to sanitize, then pull into the low level environment. The data source list 311 may enable one or multiple data sources to be selected to be used in the data refresh process. In some embodiments, the data sources may be multiple distinct servers within the production application.

The data refresh interface 300 may indicate the option to select a data destination 302, which is selectable by the user through the data destination list 312. The data destination list 312 may be a dropdown menu comprising a list of servers within the low level environment to which the testing data is to be provided. Upon completion of the data sanitization and refresh process, the production application may write the testing data to the server or servers as selected by the user. The data destination list 312 may enable the user to select one server or a plurality of servers within the low-level environment.

The data refresh interface 300 may indicate the option to select a database 303, which is selectable by the user through the database list 313. The database list 313 may be a dropdown menu comprising a list of databases containing the production data from which the testing data will be produced. The database list 313 may also comprise a list of databases within the low level environment to which the testing data is written. The database list 313 may allow the user to specify one database or a plurality of databases.

The data refresh interface may further indicate the option to select a table 304, which is selectable by the user through the table list 314. The table list 314 may be a dropdown menu comprising a list of specific tables containing the production data from which the testing data will be produced. The table list may also comprise a list of specific tables within the databases of the low-level environment to which the testing data is written. The table list 314 may enable the user to specify one or more tables from which the production data is produced or to which the testing data is written.

The data refresh interface may further indicate the option to enter a record count 305, which may be entered by the user using the record count entry field 315. The record count entry field 315 may be a text entry field, a dropdown menu, or the like, which allows the user to specify a number of test data records to be generated by the system. This allows the user to select only the number of records needed to conduct testing in a specific instance, thus increasing processing efficiency compared to embodiments in which all of the data within the low level environment databases are refreshed with testing data.

The data refresh interface 300 may further indicate an option to select a requested run date 306. The user may select a requested run date by using the run date entry field 316, which may be a text entry field which is configured to accept a date in a plurality of formats, such as MM-DD-YYYY, MM/DD/YY, and the like. In some embodiments, the data refresh interface 300 may further comprise a calendar button 326 which, if selected by the user, displays a calendar interface (not shown) which provides to the user a visual method of selecting a run date. In some embodiments, the run date is automatically set to the present date if no run date is specified. In other embodiments, the run date is a date in the future on which the data refresh process is to be run.

In some embodiments, the data fresh interface 300 may further indicate an option to enter a where clause 307. In some embodiments, the where clause modifies an database query to allow the user to add further qualifiers to the data refresh request. This allows the user to only refresh specific rows within the production data table that satisfy the conditions of the where clause. The user may enter the where clause into the where clause text entry box 317, which causes the system to append the where clause to the query before it is sent to the specified database within the production application.

The data refresh interface 300 may further comprise a submit button 308. Upon selection of the submit button 308, the low level environment application compiles a database search query to request specified production data records within the production environment and saves the query in the control table. The data refresh interface 300 may further comprise a view status button 309, which allows the user to check the status of a previous data refresh request. The view status button 309 may create a second interface on the user's display to allow the user to select the data refresh request for which the user wishes to verify the status. If the control table contains a data refresh initiation record, the view status button 309 may produce a second interface on the user's display to indicate that the data refresh request is currently pending. If the control table contains a data refresh completion record, the second interface may indicate that the data refresh request has been fulfilled. Finally, the data refresh interface 300 may comprise a search request history button 310. Upon selection by the user, the search request history button 310 may create a third interface on the user's display indicating data refresh requests that have previously been submitted by the user or other developers within the low level environment. In some embodiments, the third interface may allow the user to view previous data refresh requests made within a specified time range.

FIG. 4 is a block and symbol diagram illustrating an environment 004 comprising computer systems involved in the data refresh and sanitization process, in accordance with one embodiment of the present invention. The environment 004 may comprise one or more production computer systems 400, each comprising a communication interface 401 operatively connected to a processor 402, which is operatively connected to a memory 403 comprising the production application 100. In some embodiments, one or more databases may be stored within the memory 403, wherein the databases store production data to be sanitized for use in testing within the low level environment. The memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In some embodiment, the production application 100 may be a distributed application deployed across each of the plurality of production computer systems within the environment 004.

The one or more production computer systems 400 are operatively connected to one or more LLE computer systems 410 over a network 150. Each LLE computer system 410 comprises a communication interface 411 operatively connected to a processor 412, which is operatively connected to a memory 413 comprising the LLE application 110. The LLE application 110 may be a distributed application deployed across each of the plurality of LLE computer systems 410 within the low level environment. In some embodiments, one or more databases 414 may be stored in the memory 413, the databases comprising the testing data within the low level environment.

Also shown in FIG. 4 is the user interface 420, which is allows a user 450 to access the LLE application 110. In some embodiments, the user 450 is a developer within the low level environment. In some embodiments, the user interface 420 includes one or more output devices, such as a display and/or speaker, for presenting information to the user 450. The user interface 420 may comprise the data refresh interface. In some embodiments, the user interface 420 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 450. In some embodiments, the user interface 420 includes the input and display devices of a mobile device, which are operable to receive and display information.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for sanitizing and refreshing testing data, comprising:
   a production computer system comprising a processor, a memory device, and a communication device, and a production application stored in the memory device, the production application comprising a production data table comprising production data, and a sanitization table comprising substitute data, wherein the production application when executed by the processor causes the processor to:
   detect a data refresh request within a control table of a low level environment computer system;
   read a set of table metadata from a system table of the low level environment computer system, wherein the set of table metadata comprises a low level environment table schema;
   compare fields of the low level environment table schema of the system table with fields of a production data table schema of the production data table;
   create a copy of production data correlating to the set of table metadata;
   identify, using the sanitization table, fields requiring sanitization;
   based on comparing the fields of the low level environment table schema with the fields of the production data table schema, selectively replace the fields requiring sanitization using the substitute data; and
   write the copy of the production data into a target table of the low level environment computer system.

2. The system of claim 1, wherein the production application further causes the processor to:
   display a data refresh interface to a user, the data refresh interface comprising a submit button;
   receive one or more inputs from the user;
   detect that the user has selected the submit button; and
   generate the data refresh request based on the one or more inputs from the user.

3. The system of claim 2, wherein the data refresh interface comprises a view status button, wherein the data refresh interface is further configured to:
   detect that the user has selected the view status button; and
   generate a second interface and presents the second interface on the display, wherein the second interface indicates a status of a previously submitted data refresh request.

4. The system of claim 2, wherein the data refresh interface comprises a search request history button, wherein the data refresh interface is further configured to:
  detect that the user has selected the search request history button; and
  generate a third interface and presents the third interface on the display, wherein the third interface indicates a history of one or more previously submitted data requests.

5. The system of claim 2, wherein the one or more inputs from the user comprise a data source selection, a data destination selection, a database selection, and a table selection.

6. The system of claim 2, wherein the one or more inputs from the user comprises a record count selection, a requested run date, and a where clause, wherein the where clause further modifies the data refresh request to filter the production data.

7. The system of claim 1, wherein comparing the fields of the low level environment table schema with the fields of the production data table schema comprises identifying a set of fields existing in both the low level environment table schema and the production data table schema.

8. The system of claim 1, wherein the production application further causes the processor to modify the copy of the production data to conform with the low level environment table schema, wherein modifying the copy of the production data comprises truncating at least a portion of the copy of the production data.

9. A computer program product for sanitizing and refreshing testing data, the computer program product comprising at least one non-transitory computer readable medium having computer-readable program code portions embodied therein, the computer-readable program code portions comprising executable portions configured for:
  detecting a data refresh request within a control table of a low level environment computer system;
  reading a set of table metadata from a system table of the low level environment computer system, wherein the set of table metadata comprises a low level environment table schema;
  comparing fields of the low level environment table schema of the system table with fields of a production data table schema of a production data table;
  creating a copy of production data correlating to the set of table metadata;
  identifying, using a sanitization table, fields requiring sanitization;
  based on comparing the fields of the low level environment table schema with the fields of the production data table schema, selectively replacing the fields requiring sanitization using substitute data; and
  writing the copy of the production data into a target table of the low level environment computer system.

10. The computer program product of claim 9, wherein the computer-readable program code portions further comprise executable portions for:
  displaying a data refresh interface to a user, the data refresh interface comprising a submit button;
  receiving one or more inputs from the user;
  detecting that the user has selected the submit button; and
  generating the data refresh request based on the one or more inputs from the user.

11. The computer program product of claim 10, wherein the data refresh interface comprises a view status button, wherein the data refresh interface is further configured to:
  detect that the user has selected the view status button; and
  generate a second interface and presents the second interface on the display, wherein the second interface indicates a status of a previously submitted data refresh request.

12. The computer program product of claim 10, wherein the data refresh interface comprises a search request history button, wherein the data refresh interface is further configured to:
  detect that the user has selected the search request history button; and
  generate a third interface and presents the third interface on the display, wherein the third interface indicates a history of one or more previously submitted data requests.

13. The computer program product of claim 10, wherein the one or more inputs from the user comprise a data source selection, a data destination selection, a database selection, and a table selection.

14. The computer program product of claim 10, wherein the one or more inputs from the user comprises a record count selection, a requested run date, and a where clause, wherein the where clause further modifies the data refresh request to filter the production data.

15. A computer-implemented method for sanitizing and refreshing testing data, said method comprising:
  detecting a data refresh request within a control table of a low level environment computer system;
  reading a set of table metadata from a system table of the low level environment computer system, wherein the set of table metadata comprises a low level environment table schema;
  comparing fields of the low level environment table schema of the system table with fields of a production data table schema of a production data table;
  creating a copy of production data correlating to the set of table metadata;
  identifying, using a sanitization table, fields requiring sanitization;
  based on comparing the fields of the low level environment table schema with the fields of the production data table schema, selectively replacing the fields requiring sanitization using substitute data; and
  writing the copy of the production data into a target table of the low level environment computer system.

16. The computer-implemented method of claim 15, the method further comprising:
  displaying a data refresh interface to a user, the data refresh interface comprising a submit button;
  receiving one or more inputs from the user;
  detecting that the user has selected the submit button; and
  generating the data refresh request based on the one or more inputs from the user.

17. The computer-implemented method of claim 16, wherein the data refresh interface comprises a view status button, wherein the data refresh interface is further configured to:
  detect that the user has selected the view status button; and
  generate a second interface and presents the second interface on the display, wherein the second interface indicates a status of a previously submitted data refresh request.

18. The computer-implemented method of claim 16, wherein the data refresh interface comprises a search request history button, wherein the data refresh interface is further configured to:

detect that the user has selected the search request history button; and generate a third interface and presents the third interface on the display, wherein the third interface indicates a history of one or more previously submitted data requests.

19. The computer-implemented method of claim 16, wherein the one or more inputs from the user comprise a data source selection, a data destination selection, a database selection, and a table selection.

20. The computer-implemented method of claim 16, wherein the one or more inputs from the user comprises a record count selection, a requested run date, and a where clause, wherein the where clause further modifies the data refresh request to filter the production data.

* * * * *